United States Patent [19]

Corea et al.

[11] 4,350,481
[45] Sep. 21, 1982

[54] APPARATUS FOR CENTRIFUGAL CASTING OF THERMOSETTING PLASTICS

[76] Inventors: John E. Corea, 414 12th St., Lakewood, N.J. 08701; Emanuel R. Corea, 102 10th Ave., Belmar, N.J. 07719; Irving Tashlick, 675 Ocean Ave., Long Branch, N.J. 07740

[21] Appl. No.: 242,594

[22] Filed: Mar. 11, 1981

[51] Int. Cl.³ .............................................. B29C 5/04
[52] U.S. Cl. .................................... 425/73; 425/425; 425/434
[58] Field of Search .......................... 425/73, 425, 434

[56] References Cited

U.S. PATENT DOCUMENTS

| 3,016,573 | 1/1962 | Blue | 425/73 |
| 3,601,857 | 8/1971 | Hampel | 294/134 |
| 3,850,902 | 11/1974 | Metcalfe | 264/297 |
| 4,002,418 | 1/1977 | Wallace | 425/808 |
| 4,034,955 | 7/1977 | Wallace | 425/434 |
| 4,063,863 | 12/1977 | Hilmoe | 425/425 |
| 4,292,015 | 9/1981 | Hritz | 425/73 |

Primary Examiner—James H. Derrington
Attorney, Agent, or Firm—Patrick J. Pinto

[57] ABSTRACT

An apparatus and method for centrifugal casting of thermosetting plastic and the like in a vacuum chamber including a vacuum chamber for enclosing a rotating spinner journaled in a stationary base, a dividing hub removably engaging the spinner, a reservoir for holding the casting material within the dividing hub, the dividing hub additionally adapted to equally distribute the casting material to a plurality of nozzles extending outwardly from the dividing hub, a plurality of casting molds removably engaging the nozzles, a sleeve within a mouth of the casting mold forming a seal between the casting mold and the nozzle while reducing mold wear, a removable clamp for retaining the plurality of casting molds to the dividing hub during the spinning cycle, the plurality of casting molds additionally adapted for removal from the apparatus for transfer to a remote curing station.

9 Claims, 8 Drawing Figures

APPARATUS FOR CENTRIFUGAL CASTING OF THERMOSETTING PLASTICS

BACKGROUND OF THE INVENTION

1. Field of the Invention

With reference to the classification of art as established in and by the U.S. Patent and Trademark Office the present invention is believed to be found in the class entitled, "Plasticware Article or Earthenware Shaping or Treating Apparatus" (Class 425) and in particular in the subclass entitled, "Female Mold including Tamping means or means Utilizing Mold Motion to Distribute or Compact Stock therein" (Subclass 425).

2. Description of the Prior Art

Apparatus for centrifugally casting thermosetting plastics and the like are well known and have been shown in issued patents. Some prior art showings believed to be pertinent include U.S. Pat. No. 3,601,857 issued to Hampel on Aug. 31, 1971 which discloses materials for making a mold; U.S. Pat. No. 3,850,902 issued to Metcalfe, et al., on Nov. 29, 1974 disclosing a process for casting parts; U.S. Pat. No. 4,002,418 issued to Wallace on Jan. 11, 1977 and U.S. Pat. No. 4,034,955 also issued to Wallace on July 12, 1977. Each of these patents discloses apparatus for centrifugally casting parts and the clamping of the casting molds; U.S. Pat. No. 4,063,863 as issued to Hilmoe on Dec. 20, 1977 disclosing a centrifugal casting machine having a vacuum assist.

It is believed that none of the above identified prior art patents show or disclose the simple construction of the apparatus and method of applicant's invention or describe the improvements to the apparatus and methods for producing centrifugally cast parts from thermosetting plastics and the like.

SUMMARY OF THE INVENTION

This invention may best be summarized in part with reference to its objects.

It is an object of this invention to provide, and it does provide, an apparatus for producing centrifugally cast items made of a thermosetting plastic and the like. This apparatus is simple in construction while increasing the quantity of items produced by the apparatus.

It is a further object of this invention to provide, and it does provide, an apparatus for producing centrifugally cast items made of a thermosetting plastic and the like wherein a substantially equal distribution of casting material is made during the casting process.

It is still another object of this invention to provide, and it does provide, an apparatus for centrifugally casting of items made of a thermosetting plastic and the like wherein individual molds may be removed from the apparatus for curing without damage to the uncured cast items within the mold.

It is still a further object of the present invention to provide and it does provide an apparatus for the centrifugal casting of items made of a thermosetting plastic or the like wherein the mold wear is substantially reduced while improving the sealing means at the mouth of the mold.

In brief there is provided an improved apparatus and method for producing centrifugally cast items made of a thermosetting plastic or the like wherein productivity is increased while maintaining a high product performance rate while also lengthening the usable life of the casting molds and providing an apparatus of simple and economical construction.

In addition to the above summary the following disclosure is detailed to insure adequacy and aid in understanding of the invention and there has been chosen a specific embodiment of an apparatus for centrifugally casting of thermosetting plastics or the like and showing a preferred means of construction. This specific embodiment has been chosen for the purpose of illustration and description as shown in the accompanying drawings wherein:

DESCRIPTION OF THE DRAWINGS

In the following description and in the claims, various details are identified by specific names for convenience. These names are intended to be generic in their application. Corresponding reference characters refer to like members throughout the several figures of drawings.

DESCRIPTION OF THE PREFERRED EMBODIMENT

Figure 2:
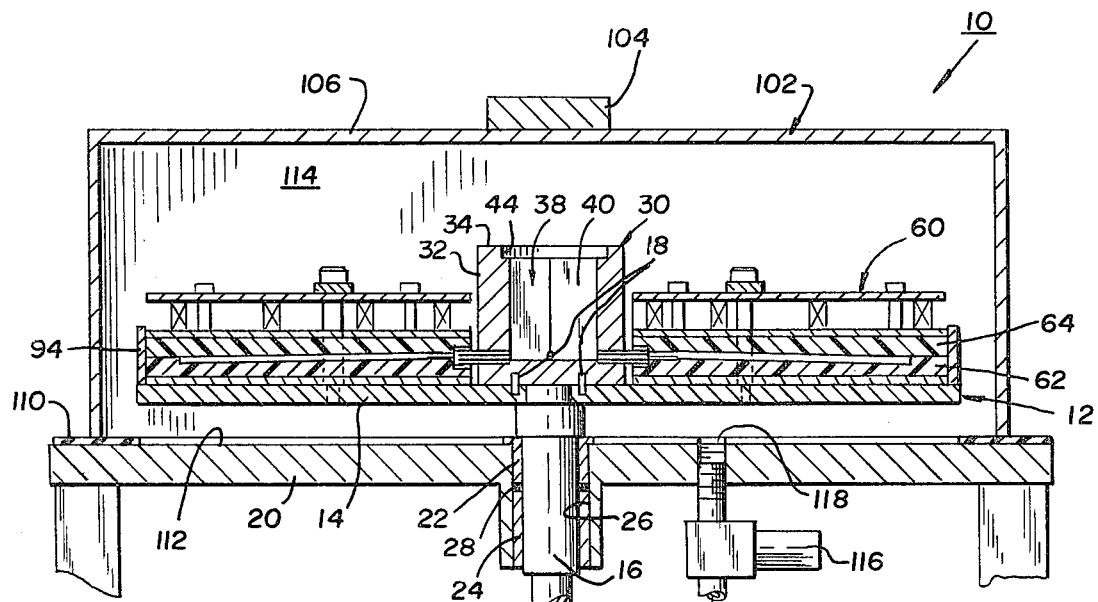
FIG. 2 is a cross sectional view of the apparatus, this view taken along the line 2—2 of FIG. 1 and looking in the direction of the arrows.
Figure 1:
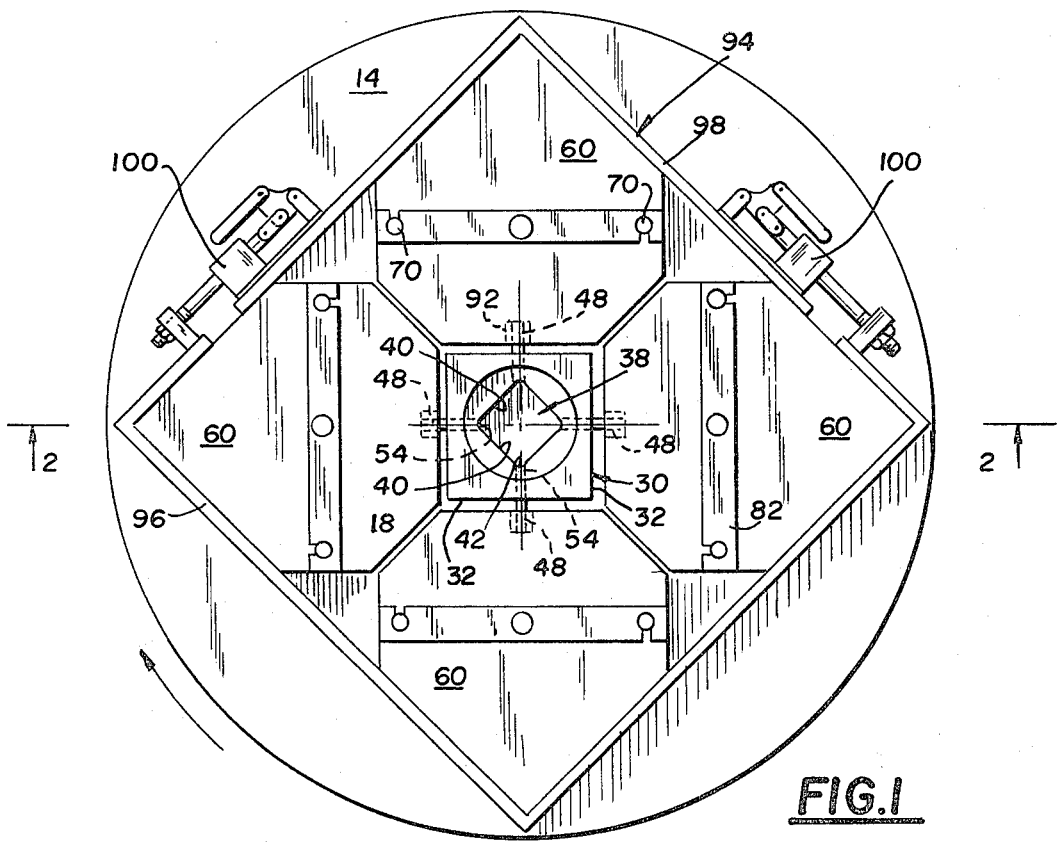
FIG. 1 is a top plan view of an apparatus for centrifugally casting thermosetting plastic items showing in particular an arrangement of the casting molds and a clamping means for removably securing the clamping molds to a dividing hub.
Figure 3:
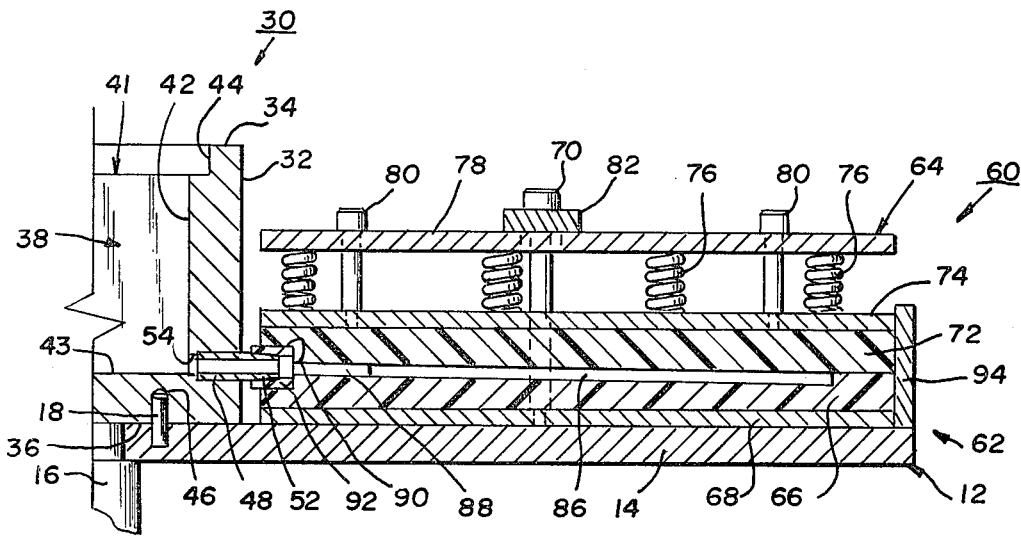
FIG. 3 is an enlarged sectional view of the casting mold and showing the connection of the mold to the dividing hub.

Referring to the drawing and in particular to FIGS. 1, 2 and 3, there is shown an improved apparatus for centrifugally casting of thermosetting plastics or the like. This casting apparatus generally identified as 10 has a spinner generally identified as 12. This spinner 12 includes a disc portion 14, a shaft portion 16 which extends downwardly and is secured to the disc 14 at one end while providing a drive means at its distal end, not shown. The drive means may include a gear, a pulley, or a sprocket which in turn is connected by conventional means to a drive motor also not shown. Extending upwardly from the disc 14 are at least two drive pins 18 secured in and to the disc portion 14 by means of a press fit or other suitable means.

The spinner 12 is rotatably journaled in and through a stationary base 20. The journal includes a first and second bearing 22 and 24. Said bearings 22 and 24 being mounted in a bore 26 provided in the stationary base 20. A shaft seal 28 such as an O-ring is provided in the bore 26 to seal both the shaft 16 and bore 26 during the casting process.

A dividing hub 30 includes a plurality of substantially vertical sides 32, a top 34, a bottom 36 and a reservoir 38. Said reservoir 38 is formed within the sides of the dividing hub 30 and has a plurality of substantially vertical sidewalls 40 corresponding in number to the number of sides 32 provided in the dividing hub 30. The reservoir 38 has one open end 41 formed in the top 34 of the dividing hub 30. The reservoir is orientated so that each corner 42, as formed by the intersection of sides 40, lies on an imaginary centerline, which is a perpendicular bisector of sides 32.

The preferred embodiment as shown has a dividing hub 30 with four sides 32 and a reservoir 38 also having four sidewalls 40. An open end 41 and a closed bottom 43 are also provided. A counterbore 44 is also formed at the open end 41 of reservoir 38. A plurality of blind holes 46 are formed in the bottom 36 of the dividing hub 30. These holes 46 are sized and spaced to fit onto and over drive pins 18 of the spinner 12. A plurality of nozzles 48 are provided at or near the closed bottom 43 of the reservoir 38. The nozzles have been shown as having a tapered extended portion or tip 52 and having a through conduit 54 connecting the vertical corners 42 of the reservoir with the nozzle tips 52. In this embodiment the nozzles 48 have been shown as being a tubular member which is secured to the dividing hub 30 by a press fit.

Figure 4:
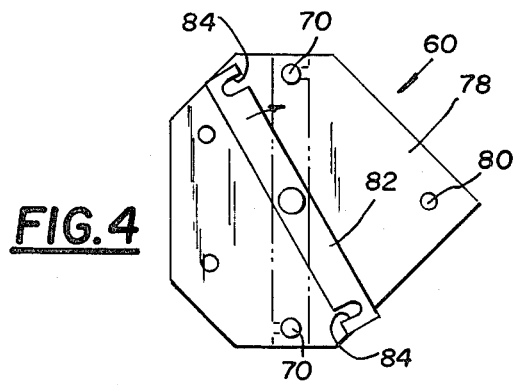
FIG. 4 is a plan view of the casting mold and showing in particular a method for removably securing the mold halves to each other.

A plurality of casting molds generally shown as 60 have lower portions 62 and upper portions 64. The lower portion 62 includes a lower mold half 66 supported by a lower plate 68. A pair of shouldered bolts 70 are fastened to and extend upwardly a predetermined distance above the lower plate 68. The upper mold half 72 is supported by an intermediate plate 74. Mold halves 66 and 72 are removably retained in the placed position by a plurality of springs 76 which provide a pressure to close and retain the mold in a closed condition when and while filling. An upper plate 78 engages the upper ends of springs 76 and is positioned by a plurality of shoulder screws 80 whose lower threaded ends enter into threaded apertures in plate 74. A keeper bar 82 is pivotally secured to the upper plate 78 and is manipulated into a retaining condition to press together mold halves 66 and 72. Radially formed slot 84 (FIG. 4) in said keeper bar 82 is adapted to slide under the heads of the shoulder bolts 70 to establish the retaining condition. Shoulder screws 80 retain the compression springs 76 between the intermediate plate 74 and the upper plate 78 when and as the upper mold portion 64 is separated from the lower mold portion 62. Alignment of the upper mold half 72 to a lower mold half 66 is provided by conventional means such as pins located at predetermined points along the mold surface. The location and size of the alignment pins are preferred to be identical for all molds of like parts so that any upper mold half 72 may be mated to a lower mold half 66 thereby avoiding the need for marking mold halves for exclusive assembly with and only with its other mating half.

A mold cavity 86 is formed by the lower mold half 66 and the upper mold half 72. In the depicted embodiment each mold half is shown as being of a plastic material preferably a thermosetting type including softer materials such as silicone rubber. A conduit portion 88 connects the cavity 86 with a mouth 90. A sleeve 92 is inserted into the mouth 90 of the casting mold 60 with the axis of the sleeve aligned with the axis of the mouth 90. This sleeve 92 is also selectively sized to snugly fit into the mouth 90 and onto and over the nozzle 48. This sleeve 92 is shown as being made of a plastic such as vinyl but other materials may be substituted that attain the like results. This sleeve 92 serves as a seal to minimize leakage of the casting material during the casting process and additionally protects the mold 60 from excessive wear during engagement and disengagement of the molds with the nozzles.

Referring to FIG. 1, the preferred embodiment is shown with four molds 60 arranged about the dividing hub 30. The contour of the molds when grouped in this arrangement forms more-or-less a square. A clamping frame 94 which includes a first member 96 which is shown more-or-less as a "C" shape, and a mating second member 98 is shown more-or-less as an angle. The first member 96 is removably secured to the second member 98 by a pair of push-pull toggle clamps 100 which are commercially available. When each of the toggle clamps 100 are in a pull condition or mode, pressure is exerted on each casting mold 60 wherein each mold 60 is urged inwardly towards the dividing hub 30 wherein and whereat the sleeve 92 seals the mouth 90 of the casting mold 60 onto the tapered nozzle tip 52. When the toggle clamps are in the push mode the clamping frame 94 is relaxed and removable from the apparatus 10. The casting molds 60 and the dividing hub 30 may be removed after removing the frame.

Figure 5:
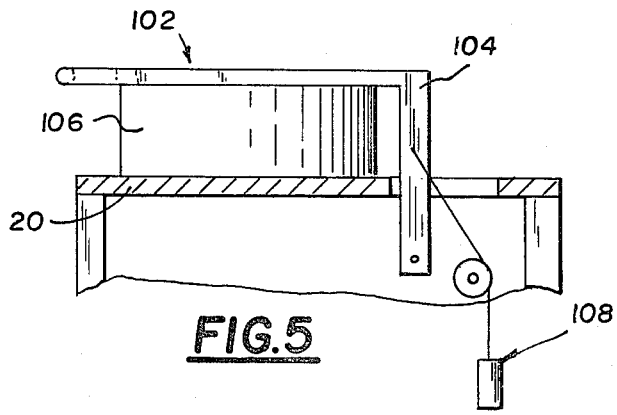
FIG. 5 is a fragmentary side elevational view, partly schematic, and showing the pivoting arrangement for the vacuum hood.

Referring now to FIG. 5 there is shown a vacuum hood generally identified as 102 which includes a mounting frame 104 and a cover 106 secured to the mounting frame 104. The mounting frame 104 is pivotally secured to the basemember 20 at a convenient point. A counter weight generally indicated as 108 may be connected to the vacuum hood 102 as an aid in opening and closing the vacuum hood.

In the use of cover 106 as in FIG. 2, a gasket 110 is provided on a top surface 112 of the basemember 20. This gasket 110 in combination with the shaft seal 28 substantially restricts the leakage of air into a vacuum chamber 114 provided by the combination of closed vacuum hood 102 and the top surface 112 of the base 20. A valve 116 is connected at one end to a vacuum inlet port 118 through the top surface 112 of the basemember and at its other end to a source of vacuum, not shown. Valve 116 is conventionally a solenoid actuated three-way type but any valve or combination of valves may be used to evacuate and vent the vacuum chamber 114.

USE AND OPERATION OF THE APPARATUS

Individual molds 60 are assembled after cleaning and preparation with a lower half 66 mated with an upper half 72. These halves are aligned as above noted and as in FIG. 4 the keeper bar 82 is manipulated to the closed condition in engagement below the heads of bolts 70. Springs 76 are compressed to the determined extent to secure the mold in a closed condition. Shoulder screws 80 prevent accidental disassembly of the plates 74 and 78 with springs 76 providing equalized pressure. Keeper bar 82 and shoulder screws 70 provide means for retaining the casting mold 60 used during handling and the molding process. A sleeve 92 is now inserted into the mouth of the casting mold 60 as in FIG. 3.

Referring again to FIG. 1, a cleaned dividing hub 30 is placed onto and over the drive pins 18 of the spinner 12. A determined number of casting molds 60 are aligned with a like number of nozzles 48 protruding from the dividing hub 30 wherein and whereat the mouth 90 and sleeve 92 of the casting mold 60 is slipped onto and over the nozzle 48. The clamp (frame) means 94 is positioned about the casting molds 60 and dividing hub 30. The operator actuates the toggle clamps 100 causing the clamping means 94 to be tightened about the casting molds 60. The squeezing action of the clamping means 94 drives the sleeve 92 onto the tapered tip 52 of the nozzle 48 providing a seal between the nozzle 48, the sleeve 92 and the mouth 90. A premixed and measured quantity of the thermosetting casting material is now placed into the reservoir 38. The vacuum hood 102 (FIG. 5) is now closed whereupon the casting cycle is now ready to begin.

CYCLE OF OPERATION

Figure 8:
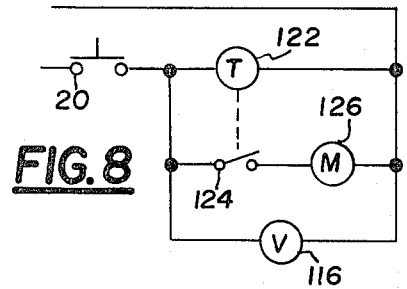
FIG. 8 is an electrical schematic of one control circuit for the centrifugal casting apparatus.
Figure 6:
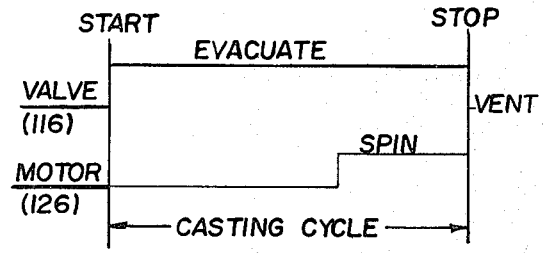
FIG. 6 is a timing diagram for the apparatus of FIG. 1.

Referring to FIGS. 6 and 8, the valve 116 is opened to allow the vacuum chamber 114 to communicate with the vacuum source, wherein and whereat the vacuum chamber 114 is evacuated to a predetermined level for a predetermined time. Evacuation of the vacuum chamber 114 also includes the evacuation of the closed molds and may also aid in the degassing of the casting material. At the completion of the vacuum cycle, a motor 126 is energized to cause the spinner 12 to rotate wherein the casting compound flows by centrifugal force to and through the nozzle 48 and into the mold cavity 86. The shape of the reservoir 38 aids in the distribution of the casting material to each of the casting molds 60 even if a leak should occur during the casting process. The casting material flows into each formed mold activity 86. The casting mold 60 is preferably disposed at a slight incline with the highest point (uppermost) of incline at the dividing hub 30 and the lowest point (distal) of incline from the dividing hub 30. This inclined cavity and the applied tension aids in the removal or disposal of any entrapped gasses which may be present during the casting process. At or near the end of the spinning cycle, the vacuum chamber 114 is vented to the atmosphere after which the vacuum hood 102 may be opened. The operator then releases and removes the clamping means 94. The filled casting molds 60 are removed from the apparatus to be combined with other molds for curing in a controlled temperature atmosphere such as an oven. The operator may use the dividing hub 30 from the previous casting cycle again or he may place a previously prepared dividing hub onto the spinner 12 along with another set of molds 60 to again begin the molding cycle.

Figure 7:
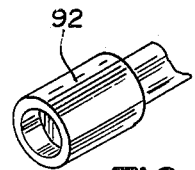
FIG. 7 is a fragmentary isometric view of a mold insert after curing and subsequent removal from a casting mold.

After curing, the molds are separated by reversing the order of assembly as previously described. The cured molded parts are removed from the molds 60 along with the sleeve 92 which is usually discarded with any excess casting material which may have hardened within the sleeve. This is shown in FIG. 7.

As show, many items may be cast with the same or different shapes of utilizing a few basic casting machines and a number of inexpensive molds. This apparatus provides the advantage of the relatively short casting cycle as compared to the longer curing time present with prior apparatus. With applicant's apparatus and process many molds may be cured simultaneously.

Referring to FIG. 8, there is shown an electrical control circuit for centrifugal casting apparatus. In this circuit a switch 120 is used to start the mold cycle. The closing of this switch energizes a timer 122 and opens valve 116. After a predetermined and preset time the timer contacts 124 close to energize motor 126. At the end of a predetermined time, switch 120 is turned to an "off" condition wherein and whereat the timer 122, valve 116 and the motor 126 are deenergized. A more-or-less fully automated circuit may be employed but the above circuit is shown as an illustration of the circuit requirements.

As a method the above apparatus for the centrifugal casting of thermosetting plastics and the like provides the novel steps of:

assembling and closing a casting mold having an upper portion and a lower portion;

placing a prepared dividing hub onto and over a plurality of drive pins provided on a spinner carried by a stationary base;

engaging a plurality of prepared closed casting molds onto and over a like number of nozzles extending from the dividing hub;

placing a clamping means around the perimeter of the casting molds;

closing and tightening the clamping means to retain the casting molds to the dividing hub;

pouring a pre-measured quantity of the thermosetting plastic into a reservoir in the dividing hub;

moving a vacuum hood to the stationary base to form a vacuum chamber with said stationary base;

evacuating the now closed vacuum chamber;

spinning the casting molds wherein the thermosetting plastic casting material flows into the casting molds;

stopping the spinning casting molds;

venting the vacuum chamber;

moving the vacuum hood to an open condition;

releasing and opening the clamping means;

curing the thermosetting plastic within the casting molds at a station remote from the apparatus;

disassembling the casting molds;

removing the cast items from the molds after curing.

It is anticipated that as few as two or as many as six casting molds may be used in combination with a dividing hub.

Terms such as left, right, back, front, in, out, near, far, upwardly, downwardly and the like are applicable to the embodiment shown and described in conjunction with the drawings. These terms are merely for the purpose of description and do not necessarily apply to the position in which the improved centrifugal casting apparatus and method may be constructed or used.

While a particular embodiment of an improved centrifugal casting apparatus and method for thermosetting plastics and the like has been shown and described, it is to be understood the invention is not limited thereto since modification may be made within the scope of the accompanying claims and protection is sought to the broadest extent the prior art allows.

What is claimed is:

1. An apparatus for centrifugal casting of thermosetting plastics and the like, said apparatus including:
   (a) a stationary base;
   (b) a spinner rotatably journaled in and through said stationary base;
   (c) means for rotating said spinner;
   (d) a dividing hub adapted for removable mounting on said spinner and adapted to spin with the rotation of said spinner, said dividing hub having a top, a bottom, a plurality of sides, a reservoir within said diving hub with said hub having a plurality of nozzles, each of said nozzles extending radially from the sides of said dividing hub;
   (e) each of said nozzles having a conduit connecting an extreme tip of each nozzle with a bottom portion of the reservoir within the dividing hub and providing for passage therethrough of a pre-measured quantity of the thermosetting plastic from the reservoir to the extreme tip of each nozzle during the casting process;

(f) a plurality of casting molds each adapted to removably engage a nozzle, the casting molds adapted to receive and mold the thermosetting plastic or the like after delivery from said tip of the nozzle;

(g) a clamping means for retaining the casting molds to the dividing hub during the rotation of the spinner;

(h) a vacuum hood and means for pivotally securing said hood to the stationary base and with gasket means to provide a vacuum chamber in combination with said stationary base, said vacuum hood when swung into closed condition on the stationary base enclosing the spinner, the dividing hub, the plurality of casting molds and said clamping means;

(i) a vacuum means connected to the vacuum chamber and with valve means and with the chamber closed adapted to evacuate said vacuum chamber to a predetermined pressure, and (j) a drive means for rotating the spinner, the mounted dividing head, the plurality of casting molds after engagement with the nozzles extending from the dividing hub and the clamping means for retaining the plurality of molds to the dividing hub.

2. An apparatus for the centrifugal casting of thermosetting plastics and the like as recited in claim 1 in which the reservoir in the dividing hub includes an open top, a closed bottom and a plurality of vertically disposed sides, the number of vertical sides with the number equalling the number of nozzles extending from the dividing hub, said vertical sides intersecting and forming substantially vertical corners, these vertical corners being disposed to intersect the conduits to the nozzles at or near the closed bottom of the reservoir, the intersect of the said sides and the conduit openings at said intersecting points assisting in the aiding in the equal distribution of the thermosetting plastic to the casting molds.

3. An apparatus for the centrifugal casting of thermosetting plastics and the like as recited in claims 1 or 2 wherein the nozzles further include a tapered tip portion for assisting in the engagement of the casting molds to the nozzles.

4. An apparatus for the centrifugal casting of thermosetting plastics and the like as recited in claim 3 wherein the casting mold further includes a mouth portion, a resilient sleeve inserted within said mouth portion and in close relationship thereto with the axis of the resilient sleeve coincident with the axis of the mouth of the casting mold, the resilient sleeve adapted to fit closely onto and over the tapered tip portion of the nozzle, the resilient sleeve substantially reducing leakage of the thermosetting plastic during the casting process in addition to substantially preventing excessive wear of the tip of the nozzle and the casting mold by repeated engagement and disengagement of these parts.

5. An apparatus for the centrifugal casting of thermosetting plastics and the like as recited in claim 4 wherein the resilient sleeve is made from an inexpensive material wherein the sleeve and excess plastic material from the mold gate may be discarded.

6. An apparatus for the centrifugal casting of thermosetting plastics and the like as recited in claim 1 or 2 wherein the casting mold further includes a lower portion, an upper portion, and a pivoting keeper bar for quickly securing the upper portion to the lower portion.

7. An apparatus for the centrifugal casting of thermosetting plastics and the like as recited in claim 5 wherein the casting mold further includes a resilient biasing means for maintaining a constant pressure at a parting line of the upper portion of the casting mold and the lower portion of the casting mold.

8. An apparatus for the centrifugal casting of a thermosetting plastic and the like as recited in claim 5 wherein the casting mold further includes a mold cavity, this mold cavity being disposed at an incline to a substantially horizontal surface and having a highest point of inclination near the mouth of the casting mold, and the lowest point of inclination near the distal end of the casting mold, this inclination of the mold cavity assisting in preventing the entrapment of air or gasses in the mold cavity during the casting process.

9. An apparatus for the centrifugal casting of thermosetting plastics and the like as recited in claim 4 wherein the clamping means includes a first member, a second member and at least two toggle clamps securing the first member to the second member and providing manipulative means for quickly engaging and disengaging the clamping means.

* * * * *